(Model.)
J. DAVIS.
APPARATUS FOR TANNING.
No. 245,142. Patented Aug. 2, 1881.
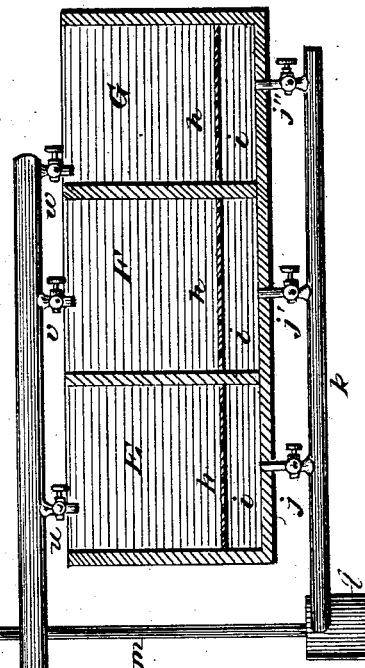
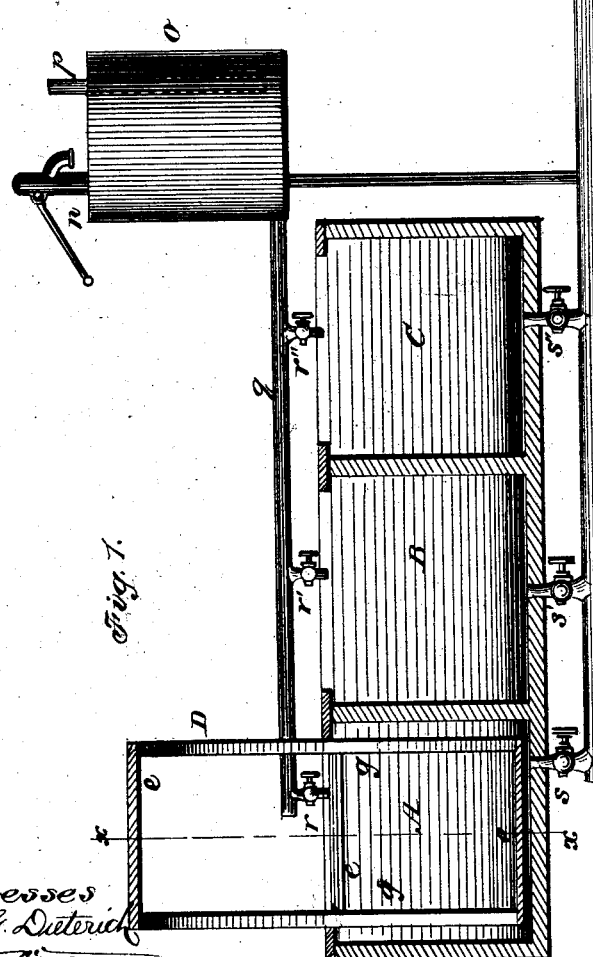
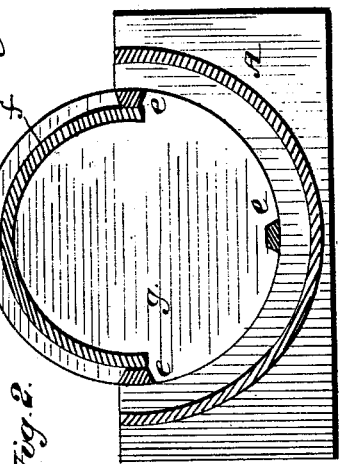
Witnesses
Fred G. Dieterich
D. C. Allen
Inventor
John Davis
J. J. Johnston
Atty

UNITED STATES PATENT OFFICE.

JOHN DAVIS, OF ALLEGHENY, PENNSYLVANIA.

APPARATUS FOR TANNING.

SPECIFICATION forming part of Letters Patent No. 245,142, dated August 2, 1881.

Application filed August 24, 1880. (Model.)

*To all whom it may concern:*

Be it known that I, JOHN DAVIS, of Allegheny, in the county of Allegheny and State of Pennsylvania, have invented a new and useful Improvement in Apparatus for Tanning; and I do hereby declare that the following is a full, clear, and exact description thereof, reference being had to the accompanying drawings, and to the letters of reference marked thereon.

My invention relates to an improvement in apparatus for tanning; and the invention consists in a novel combination and arrangement of parts, all as will be hereinafter fully described, and specifically designated in the claim.

To enable others skilled in the art with which my invention is most nearly connected to make and use it, I will proceed to describe its construction and operation.

In the accompanying drawings, which form part of my specification, Figure 1 is a vertical section of my improvement in apparatus for tanning the skins of animals. Fig. 2 is a transverse section of the same at line $x\ x$ of Fig. 1.

In the accompanying drawings, A B C represent tanning-vats, each of which should be furnished with a reel, D, as shown in vat A and Fig. 2, in and to which reels should be attached the skins which are to be subjected to the tanning process. The reels are revolved slowly in the vats by means of suitable driving-gear, the construction and arrangement of which I leave to the judgement of the mechanic.

The skins to be tanned may be doubled over half-hoops and secured in any suitable manner within the circle of the bars $e$ of the reel, one or more of which bars may be detachable.

The arrangement of the hoops within the circle of the bars $e$ is clearly indicated in Fig. 2, in which $f$ represents the hoop, $e$ the bars, $g\ g$ the ends of the reel to which said bars are attached. The desirable form of the vats A B C is shown in the accompanying drawings.

E F G represent leaching-vats, provided with perforated bottoms $h$, on which the ground bark is placed. Below the bottoms $h$ are chambers $i$, into which the tanning-liquor flows. These chambers $i$ communicate by branch pipes $j$ with a main, $k$, which communicates with a receiver, $l$, in which is placed a pipe, $m$, connected with a pump, $n$, for pumping the tanning-liquor into a tempering-vat, $o$; in which the tanning-liquor is heated to about blood heat by means of a steam-pipe, $p$, which extends to near the bottom of the vat $o$, or it may be heated by means of a coil of pipe through which flows a current of steam; or said liquor may be heated by any other means which may suggest itself to the skillful mechanic.

To the vat $o$ is connected a pipe, $q$, having branches $r\ r'\ r''$, which communicate with the vats A B C, to the bottom of which are attached pipes $s\ s'\ s''$, which communicate with a pipe, $t$, having branches $u\ v\ w$, which communicate with the upper part of the leaching-vats E F G. The branch-pipes $j\ j'\ j''\ r\ r'\ r''\ u\ v\ w$, and pipes $s\ s'\ s''$ are provided with stop-valves.

The construction, arrangement, and relation of the several parts of the apparatus hereinbefore described, and shown in the accompanying drawings, will readily be understood by the skillful mechanic. I will therefore proceed to describe the operation.

The leaching-vats E F G are charged with ground bark and supplied with water, and the reels are filled with skins prepared in the usual manner for the tanning process. The liquor in the chamber $i$ of the leach-vat E indicating about two degrees of strength by the barkometer, the operator opens the valve of the branch pipe $j$, which will allow the liquor to flow from the chamber $i$ into the main $k$, from which it flows into the receiver $l$, from which it is pumped into the tempering-vat $o$ by the pump $n$, where it is heated to about blood-heat, and flows from the vat $o$, through pipe $q$, and through its branches $r\ r'\ r''$ into the vats A B C, and from them flows through the branches $s\ s'\ s''$ into pipe $t$, and from it through branches $u\ v\ w$, back into the leaching-vats E F G, as may be desired by the operator. During the flow of the liquor into the tanning-vats A B C the reels are constantly revolved, so as to bring the skins stretched on the reels alternately half of each revolution of the reels in the air and one-half of the time of each revolution in the tanning-liquor, thereby exposing them one-half of the time of each revolution to the oxidizing influence of the atmosphere, and the other half of the time agitating them in the liquor, which is constantly and gradually increasing in strength or specific gravity. The liquor is gradually increased in strength or specific gravity by the operator allowing liquor to flow from the leaching-vats F G through branches $j'$ $j''$ into the main $k$, which liquor becomes mixed with the liquor flowing from the leaching-vat E.

By the arrangement of the vats, pipes, and valves hereinbefore described the operation of any one of them may be dispensed with at the pleasure of the operator.

It will be observed that by the arrangement of the leaching and tanning vats, tempering-vat, receiver, pumps, pipes, and valves, and their operation with relation to each other, the leaching and tanning operations are combined, and that these combined operations are continuous and agitative, which, combined with the counter agitation of the reels through the flowing liquor, will subject the skins to a most thorough agitation in and through the liquor, which, combined with the frequent exposure of the skins to the air, will greatly facilitate the tanning process, and greatly shorten the time usually required for tanning skins.

I am aware that agitating the skins of animals in a vat or vats through which is a continuous flow of tanning-liquor which is gradually increasing in strength from the commencement to the close of the tanning process is old, and such I do not wish to be understood as claiming, broadly, as of my invention.

Having thus described my improvement, what I claim as of my invention is—

In an apparatus for tanning, the combination of a series of leaching-vats, a series of tanning-vats having reels, intermediate connecting-pipes with valves, receiving-vessel, pump, and a tempering-vat, the several parts arranged and operating with relation to each other, substantially as shown, whereby the hides may be subjected to the alternate action of the atmosphere and tanning-liquor, the strength of said liquor may be graduated and continuously increased from the beginning to the end of the tanning process, and said liquor, when spent, being returned to the leaching-vats, substantially as specified.

JOHN DAVIS.

Witnesses:
  A. C. JOHNSTON,
  JAMES J. JOHNSTON.